United States Patent
Han et al.

(10) Patent No.: US 9,302,635 B2
(45) Date of Patent: Apr. 5, 2016

(54) WATERPROOF COVER

(71) Applicant: SUMITOMO WIRING SYSTEMS, LTD., Mie (JP)

(72) Inventors: Hojea Han, Mie (JP); Masashi Sawada, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/399,080

(22) PCT Filed: Jan. 22, 2013

(86) PCT No.: PCT/JP2013/051153
§ 371 (c)(1),
(2) Date: Nov. 5, 2014

(87) PCT Pub. No.: WO2013/175808
PCT Pub. Date: Nov. 28, 2013

(65) Prior Publication Data
US 2015/0101842 A1 Apr. 16, 2015

(30) Foreign Application Priority Data
May 22, 2012 (JP) .................................. 2012-116689

(51) Int. Cl.
*B60R 16/02* (2006.01)
*H02G 3/04* (2006.01)
*H02G 15/013* (2006.01)

(52) U.S. Cl.
CPC .......... *B60R 16/0215* (2013.01); *B60R 16/0222* (2013.01); *H02G 3/0418* (2013.01); *H02G 15/013* (2013.01)

(58) Field of Classification Search
CPC .......... H02G 3/22; H02G 3/0418; H02G 3/24; H02G 3/26; H02G 3/28; H02G 3/30; B60R 16/02; B60R 16/0215; B60R 16/0222
USPC ...... 174/650, 653, 66, 68.1, 68.3, 72 A, 74 R, 174/72 C, 88 R, 70 C, 152 G, 153 G, 137 R, 174/17 VA; 248/49, 68.1
See application file for complete search history.

(56) References Cited

U.S. PATENT DOCUMENTS

| | | | |
|---|---|---|---|
| 7,189,918 B2 * | 3/2007 | Sakata | ................ B60R 16/0239 174/17 VA |
| 7,211,732 B2 * | 5/2007 | Yagi | ................... H01R 13/5205 174/74 R |

(Continued)

FOREIGN PATENT DOCUMENTS

| | | |
|---|---|---|
| JP | 62-119879 | 6/1987 |
| JP | 2000-358316 | 12/2000 |

(Continued)

*Primary Examiner* — Angel R Estrada
(74) *Attorney, Agent, or Firm* — Greenblum & Bernstein, P.L.C.

(57) ABSTRACT

A waterproof cover can prevent substantial deformation thereof and maintain high waterproof performance even when temperature inside the waterproof cover changes. The waterproof cover has a peripheral wall composed of a rubber or elastomer. Two end portions of the peripheral wall are connected to an attachment member. The peripheral wall has an attachment hole passing through the peripheral wall in a thickness direction. A ventilation film is provided inside the attachment hole as an inner pressure adjustment member to adjust inner pressure of the waterproof cover.

10 Claims, 6 Drawing Sheets

(56) References Cited

U.S. PATENT DOCUMENTS 8,108,968 B2 * 2/2012 Pietryga .............. H02G 3/0468
174/152 G
9,093,765 B2 * 7/2015 Kuji .................... H01R 13/193

FOREIGN PATENT DOCUMENTS

| JP | 2001-024353 | 1/2001 |
| JP | 2010-215010 | 9/2010 |

* cited by examiner

PRIOR ART

WATERPROOF COVER

TECHNICAL FIELD

The present invention relates to a waterproof cover, specifically, a waterproof cover capable of preventing substantial deformation thereof and maintaining high waterproof performance even when temperature inside the waterproof cover changes, the waterproof cover being composed of a rubber or elastomer and being attached to a terminal of a tightly-closed exterior material through which a high-pressure wire harness routed in an electric automobile or a hybrid automobile.

BACKGROUND ART

Conventionally, a high-pressure wire harness is mainly routed in an underbody under a floor panel, the wire harness being routed between a motor and an inverter or between an inverter and a battery in a hybrid automobile or an electric automobile. In the wire harness routed in the underbody, electric wires included in the wire harness are inserted through a metal pipe, for example, for protection and shield from water, stones, and the like, and then the metal pipe is piped and fixated to a lower surface of the floor panel (refer to Patent Literature 1: Japanese Patent Laid-Open Publication No. 2010-215010). Furthermore, an end portion of the wire harness is routed in an engine compartment or in the rear of a passenger cabin, and thus a flexible exterior material, such as a corrugated tube, connected to the metal pipe is often mounted externally.

In addition, a waterproof cover 1 having a shape as shown in FIG. 4, for example, is attached to a terminal of the wire harness W/H. Specifically, the waterproof cover 1 is composed of a rubber or elastomer. A small-diameter tubular portion 1a on a first end side of the waterproof cover 1 is externally fitted and fixated to an end portion of an exterior material 2, such as the metal pipe or non-slit corrugated tube, and a large-diameter tubular portion 1c on a second end side connected via a widening-diameter tubular portion 1b is externally fitted and fixated to a shield shell (not shown in the drawing), which is bolt-fastened and fixated to a case of an inverter, a motor, or a battery. Thus, water is prevented from entering through the terminal of the wire harness W/H. A corrugated portion 1d may be provided in an area from the widening-diameter tubular portion 1b to the large-diameter tubular portion 1c of the waterproof cover 1.

To prevent water from entering through a connection portion between the metal pipe and the corrugated tube, a waterproof cover may be attached to the connection portion.

CITATION LIST

Patent Literature

Patent Literature 1: Japanese Patent Laid-Open Publication No. 2010-215010

SUMMARY OF INVENTION

Technical Problem

However, the exterior material 2, such as the metal pipe or the corrugated tube connected to a front end of the metal pipe, which is externally mounted to the high-pressure wire harness routed in the underbody has a tightly-closed structure, and the waterproof cover 1 connected to the exterior material 2 also has a tightly-closed structure. Due to a change in inner pressure associated with a change in temperature inside the waterproof cover 1, the waterproof cover 1 repeatedly expands and contracts. In particular, since the high-pressure wire harness is inserted through the tightly-closed pipe and tube, the waterproof cover 1 may expand substantially due to an increase in temperature, and thus interfere with a peripheral member and get damaged. In addition, sealing performance in the connection portion may deteriorate due to expansion and contraction of the waterproof cover 1, and is thus unable to maintain good waterproof performance.

In view of the above circumstances, an objective of the present invention is to prevent substantial deformation of a waterproof cover and maintain high waterproof performance even when temperature inside the waterproof cover changes.

Solution to Problem

In view of the above, the present invention provides a waterproof cover having a peripheral wall covering a circumference of a wire harness, the peripheral wall being composed of one of a rubber and an elastomer, the peripheral wall having two end portions connected to an attachment member. The peripheral wall has an attachment hole passing through the peripheral wall in a thickness direction and an inner pressure adjustment member adjusting inner pressure of the waterproof cover is provided inside the attachment hole.

As described above, in the present invention, the inner pressure adjustment member is provided inside the attachment hole in the peripheral wall composed of a rubber or elastomer. The inner pressure adjustment member prevents foreign objects, such as water and refuse, from entering from outside and ensures the waterproof cover to be breathable, thus preventing a change in inner pressure even when temperature inside the waterproof cover changes. Accordingly, the waterproof cover is prevented from deforming substantially and sealing performance is prevented from deteriorating in the two end portions of the peripheral wall. Concurrently, the waterproof cover, which expands substantially due to an increase in temperature, is prevented from interfering with a peripheral member and getting damaged. Thus, the waterproof cover maintains high waterproof performance.

The peripheral wall preferably has an attachment tubular portion projecting outward in the thickness direction of the peripheral wall and the attachment hole is preferably provided inside the attachment tubular portion. This expands a range of providing the attachment hole in the projecting direction of the attachment tubular portion, thus expanding a range of installing the inner pressure adjustment member.

The inner pressure adjustment member is preferably a ventilation film provided inside a resin tube for ventilation and the resin tube for ventilation is preferably attached to the attachment tubular portion. Since the ventilation film is attached to the attachment tubular portion via the resin tube for ventilation, attachment performance of the ventilation film is increased.

The ventilation film is not limited to a specific material, provided that a material allows air to permeate and prevents liquid and solid from permeating, such as a resin porous film, woven fabric, nonwoven fabric, net, or foam. Among others, a ventilation film composed of a fluorine resin (polytetrafluoroethylene (PTFE)) porous body is preferably used due to high breathability and prevention of entering foreign objects, such as water and refuse.

The inner pressure adjustment member is preferably attached to a ventilation member and the ventilation member is preferably attached to the resin tube for ventilation. This eliminates from the resin tube for ventilation a structure to attach the ventilation film as the inner pressure adjustment member, thus simplifying a structure of the resin tube for ventilation and reducing manufacturing cost.

The resin tube for ventilation preferably has a ventilation member attachment portion allowing the ventilation member to be tightly fitted. This requires only replacement of the ventilation member to be fitted even when a type of the ventilation film is changed, thus enhancing versatility of the resin tube for ventilation.

The resin tube for ventilation preferably has an insertion portion extending from the ventilation member attachment portion and insertable to the attachment tubular portion. The ventilation member attachment portion preferably has a bottom wall having an opening connected to a hollow portion of the insertion portion. The bottom wall preferably has a portion projecting outward more than an outer periphery of the insertion portion and is positioned to be contactable with a projecting end of the attachment tubular portion. Since the projecting end of the attachment tubular portion comes into contact with the projecting portion of the bottom wall of the resin tube for ventilation, fitting end surfaces of the attachment tubular portion of the peripheral wall and the insertion portion of the resin tube for ventilation are not exposed externally. This effectively prevents water from entering through the fitting surfaces.

The insertion portion preferably has a concavo-convex portion on an outer peripheral surface. A binding band is preferably wound around an outer peripheral surface of the attachment tubular portion corresponding to the concavo-convex portion. Thus, the resin tube for ventilation is preferably fixated to the attachment tubular portion. This increases adhesion between the attachment tubular portion of the peripheral wall and the insertion portion of the resin tube for ventilation, thus preventing water from entering between the fitting surfaces.

The ventilation member preferably includes a plurality of lock portions inserted and locked to the opening of the bottom wall, and a ventilation film holder extending from the lock portions and fixated to the bottom wall via a rubber ring for sealing. The ventilation film holder preferably includes an annular support portion supporting a periphery of the circular ventilation film from a lower surface side, a circular cover portion provided on an upper surface side of the ventilation film with a gap therebetween, and a plurality of side wall portions linking the support portion and a periphery of the cover portion. A gap between adjacent side wall portions is preferably a ventilation hole. Accordingly, the ventilation film is protected from getting hit by foreign objects, such as water and refuse, while breathability is ensured. Provided that the ventilation member can be fitted in a sealed state to the ventilation member attachment portion of the resin tube for ventilation, the ventilation member is not limited to the structure above. The circular shape is not limited to a true circle, but may also include an ellipse.

A plurality of side walls preferably stand with gaps therebetween from the periphery of the bottom wall provided to the ventilation member attachment portion of the resin tube for ventilation. Thus, the side walls protect the ventilation member attached to the ventilation member attachment portion and concurrently the gaps between the side walls secure lateral ventilation paths.

The wire harness is preferably routed in a vehicle underbody and two ends are connected to a motor and an inverter or an inverter and a battery. A first end portion of the peripheral wall is preferably attached to one of an end portion of a metal pipe externally mounted to the wire harness and an end portion of a corrugated tube connected to the metal pipe. A second end portion of the peripheral wall is preferably attached to one of a housing and a shell-shaped member attached to a case of one of the motor, the inverter, and the battery. Such a configuration fully achieves benefits of the prevent invention.

The first end portion of the peripheral wall is a small-diameter tubular portion and the second end portion of the peripheral wall is a large-diameter tubular portion having a larger diameter than the small-diameter tubular portion. The small-diameter tubular portion has an attachment tubular portion projecting outward in a thickness direction of the small-diameter tubular portion and the attachment hole is provided inside the attachment tubular portion. The large-diameter tubular portion and the attachment tubular portion have portions overlapping each other in a projecting direction of the attachment tubular portion. Since the attachment tubular portion has the portion overlapping the large-diameter tubular portion in the projecting direction, the attachment tubular portion is prevented from projecting substantially from the large-diameter tubular portion and is readily prevented from interfering with a peripheral member. Thus, the waterproof cover having excellent space efficiency is provided.

Advantageous Effects of Invention

The ventilation film provided in the resin tube for ventilation prevents foreign objects, such as water and refuse, from entering and ensures the waterproof cover to be breathable, thus preventing a change in inner pressure even when the temperature inside the waterproof cover changes. Accordingly, the waterproof cover is prevented from deforming substantially and sealing performance is prevented from deteriorating in the two end portions of the peripheral wall. Concurrently, the waterproof cover, which expands substantially due to an increase in temperature, is prevented from interfering with a peripheral member and getting damaged. Thus, the waterproof cover maintains high waterproof performance.

DESCRIPTION OF EMBODIMENTS

<First Embodiment>

A first embodiment of the present invention is described below with reference to the drawings.

Figure 1A:
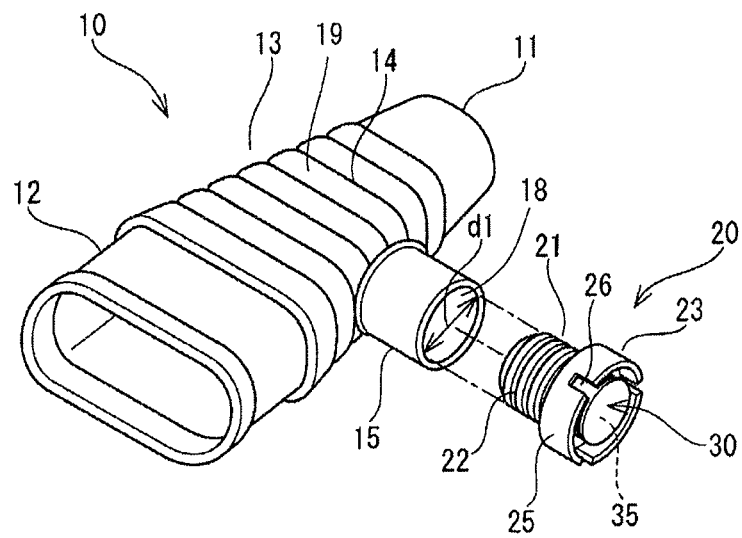
[FIG. 1(A)] An exploded perspective view of a waterproof cover according to a first embodiment of the present invention.
Figure 1B:
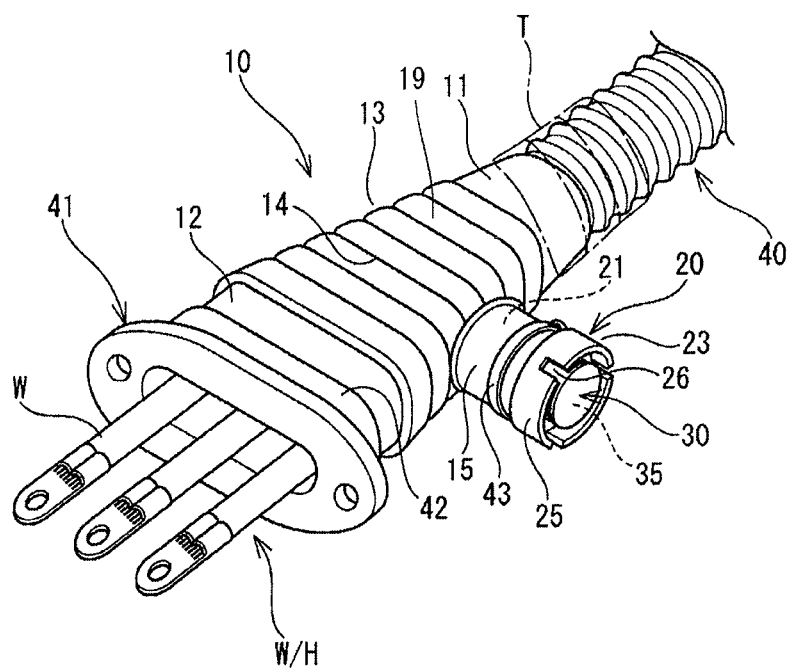
[FIG. 1(B)] A perspective view of the waterproof cover when a resin tube for ventilation is attached.
Figure 2A:
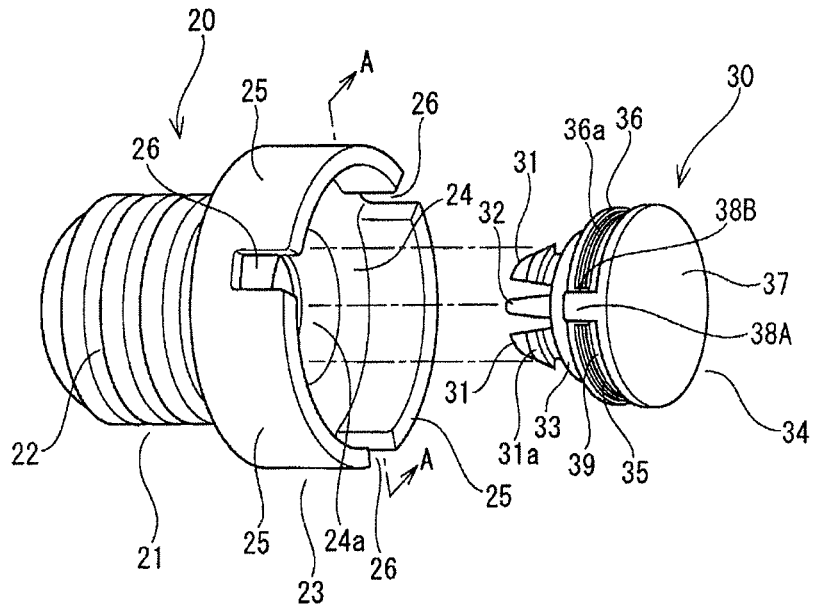
[FIG. 2(A)] An exploded perspective view of the resin tube for ventilation to which a ventilation member is fitted.
Figure 2B:
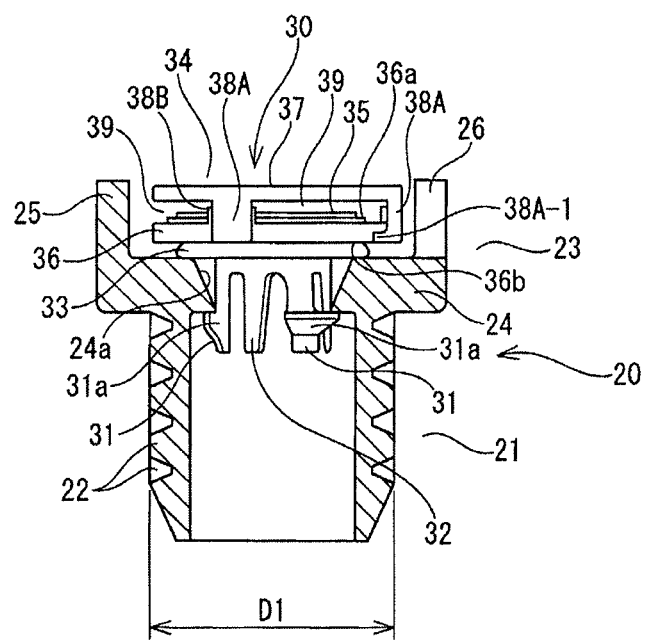
[FIG. 2(B)] A partial cross-sectional view along line A-A of the resin tube for ventilation to which the ventilation member is fitted.
Figure 3:
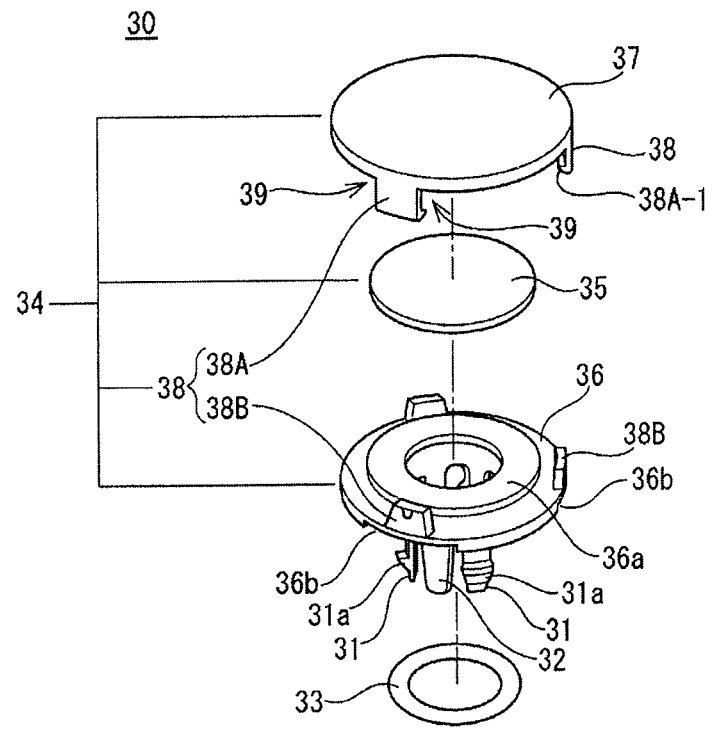
[FIG. 3] An exploded perspective view of the ventilation member.
Figure 4:
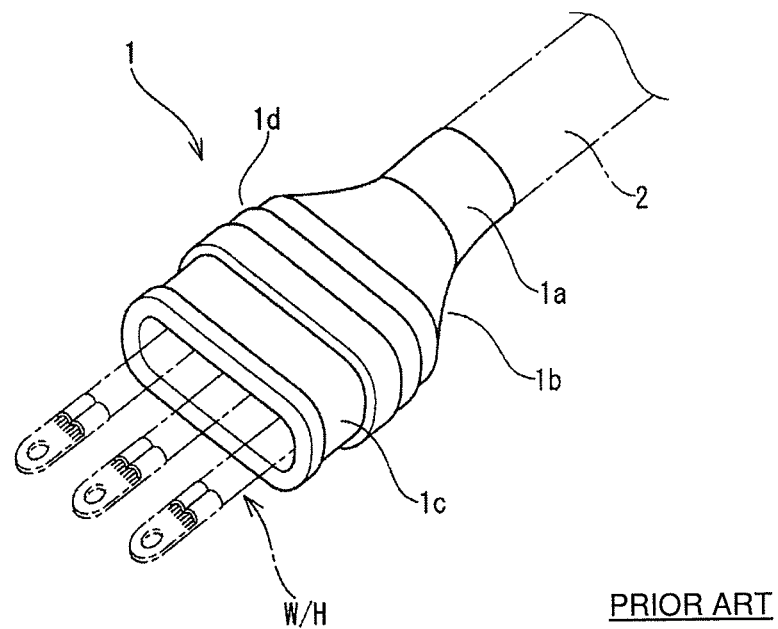
[FIG. 4] A view illustrating a conventional example.

FIGS. 1 to 3 illustrate the first embodiment of the present invention.

In the present embodiment, a high-pressure wire harness W/H including three insulating covered electric wires W is wired between a motor and an invertor or between an inverter and a battery in a hybrid automobile. In a wiring area in a vehicle underbody, the wire harness W/H is inserted through a metal pipe (not shown in the drawings) composed of an aluminum metal.

The wire harness W/H is pulled from the wiring area in the underbody into an engine compartment (not shown in the drawings) in a front portion of the vehicle or into a passenger cabin (not shown in the drawings) in a rear portion of the vehicle, and is connected to the motor and the inverter or to the inverter and the battery. Two end portions of the wire harness H/W are first inserted through a corrugated tube (non-slit corrugated tube) 40, which is tightly fitted and connected to a terminal of the metal pipe. Then, a waterproof cover 10 shown in FIG. 1 is attached to a terminal of the wire harness W/H which is pulled out from a terminal opening of the corrugated tube 40.

The waterproof cover 10, which is a molded component composed of a rubber or elastomer (EPDM in the present embodiment), has a peripheral wall 19 covering a circumference of the wire harness W/H. The peripheral wall 19 has a tubular shape elongated in an extending direction of the wire harness W/H and has openings in two end portions in a length direction of the peripheral wall 19. A link portion 11 in a first end portion in the length direction of the peripheral wall 19 of the waterproof cover 10 is a small-diameter tubular portion, which is externally fitted to an end portion of the corrugated tube 40 and is tightly fitted and fixed by winding a tape (T). A link portion 12 in a second end portion in the length direction of the peripheral wall 19 of the waterproof cover 10 is a flat large-diameter tubular portion, which is externally fitted to a shield shell 41 and is tightly fitted and fixed by a crimping ring 42, the shield shell 41 being bolt-fastened to a case (not shown in the drawings) of a device to be connected, such as a motor, an inverter, or a battery. The small-diameter tubular link portion 11 and the large-diameter tubular link portion 12 are connected via an intermediate portion 13, which is a tubular portion having a widening diameter and includes a corrugated portion 14. The corrugated tube 40 and the shield shell 41 are attachment members according to the present invention.

An attachment tubular portion 15, to which a cylindrical resin tube for ventilation 20 is attached, integrally projects in a lateral direction (outward in a thickness direction of the peripheral wall 19) from the peripheral wall 19 of the intermediate portion 13 of the waterproof cover 10. The attachment tubular portion 15 has thereinside an attachment hole 18, which passes through the peripheral wall 19 in the thickness direction and extends in the projecting direction of the attachment tubular portion 15. With reference to FIGS. 1 and 2, a separate ventilation member 30 is attached to a front end portion of the resin tube for ventilation 20, which is attached inside the attachment hole 18 of the attachment tubular portion 15, the ventilation member 30 having a ventilation film 35 fixed thereto as an inner pressure adjustment material. Thus, the inner pressure of the waterproof cover 10 is adjusted through the ventilation film 35.

The resin tube for ventilation 20, which is a resin molded component composed of a glass fiber reinforced polybutylene terephthalate (PBT) or the like, has a ventilation member attachment portion 23 extending from a cylindrical insertion portion 21, which is internally fitted to the attachment tubular portion 15 of the waterproof cover. The separate ventilation member 30 is tightly fitted to the ventilation member attachment portion 23.

An outer diameter D1 of the insertion portion 21 is slightly larger than an inner diameter d1 of the attachment hole 18 of the attachment tubular portion 15 such that the insertion portion 21 can be tightly fitted inside the attachment tubular portion 15. Furthermore, a front end portion of an outer peripheral surface of the insertion portion 21 is tapered to allow easy insertion into the attachment hole 18 of the attachment tubular portion 15. The insertion portion 21 has an annular concavo-convex portion 22 provided alternately in the length direction on the outer peripheral surface so as to increase a contact area with an inner peripheral surface of the attachment tubular portion 15 for better adhesion.

The ventilation member attachment portion 23 of the resin tube for ventilation 20 has a shape corresponding to the ventilation member 30 fitted thereto. In the present embodiment, the ventilation member attachment portion 23 has a shape that allows fitting of a commercially available ventilation member 30 (product name: TEMISH manufactured by Nitto Denko Corp.) shown in FIGS. 2 and 3, as described below. However, the shape is not limited to the description below.

In the resin tube for ventilation 20 of the present embodiment, the ventilation member attachment portion 23 includes a bottom wall 24 and a plurality of (three in the present embodiment) side walls 25, the bottom wall 24 having a larger diameter than the insertion portion 21, the side walls 25 standing from a periphery of the bottom wall 24. A peripheral portion of a lower surface of the bottom wall 24 is positioned so as to project outward in a diameter direction of the insertion portion 21. When the resin tube for ventilation 20 is attached to the attachment tubular portion 15, the peripheral portion of the lower surface of the bottom wall 24 comes into contact with a projection end of the attachment tubular portion 15. In addition, the bottom wall 24 has a circular opening 24a connected to a hollow portion of the insertion portion 21. A peripheral wall of the opening 24a is tapered toward the hollow portion of the insertion portion 21 such that lock portions 31 (described later) of the ventilation member 30 can be inserted and locked smoothly. Furthermore, the three side walls 25 of the present embodiment are provided with equal gaps 26 therebetween. A center angle of an arc of one side wall 25 is approximately 100° to 110°. In the present embodiment, the side walls 25 are provided to the periphery of the bottom wall 24. However, the side walls 25 may be omitted.

The ventilation member 30 has three lock portions 31, three insertion pieces 32, and a ventilation film holder 34. The lock portions 31 each have a projecting locking hook 31a inserted and locked in the bottom wall opening 24a of the ventilation member attachment portion 23. The insertion pieces 32 have no locking hook. The lock portions 31 and the insertion pieces 32 are provided alternately in a circumferential direction. The ventilation film holder 34 extends from upper ends of the lock portions 31 and the insertion pieces 32. The ventilation film holder 34 is fixated to the bottom wall 24 of the ventilation member attachment portion 23 through a rubber ring for sealing 33.

The ventilation film holder 34 has an annular support portion 36 fixating a periphery of the circular ventilation film 35 to an end portion 36a and supporting the ventilation film 35 from a lower surface side.

For the ventilation film 35 supported by the support portion 36, a porous body composed of a fluorine resin (polytetrafluoroethylene (PTFE)) is used in the present embodiment. Alternatively, another porous body, woven fabric, nonwoven fabric, net, or foam can be used. To increase strength of the ventilation film 35, a reinforcement layer composed of a woven fabric, nonwoven fabric, net, or foam is preferably layered. The periphery of the ventilation film 35 is fixated to the end portion 36a of the support portion 36 by heat welding, ultrasonic welding, or bonding. An area of the ventilation film 35 fixated to the end portion 36a of the support portion 36 is 5% to 20% of the entire area of the ventilation film 35.

A circular cover portion 37 is provided on an upper surface side of the ventilation film 35 with a gap therebetween to prevent foreign objects, such as water and refuse, from entering from above and hitting the ventilation film 35. Three side wall portions 38A project downward from a periphery of the cover portion 37 with equal gaps therebetween. The side wall portions 38A each have a projecting locking hook 38A-1 in a front end portion so as to be locked with a locking groove 36b provided in a corresponding position in a peripheral lower end portion of the support portion 36. Thus, the support portion 36 and the cover portion 37 are connected by the side wall portions 38A. In addition, three side wall portions 38B project upward from corresponding positions in a periphery of the support portion 36 with equal gaps therebetween, as shown in FIG. 3. Thereby, the side wall portions 38 (38A, 38B) have a double structure, thus increasing strength. The gap between the adjacent side wall portions 38 serves as a ventilation hole 39 for air that comes in and out through the ventilation film 35. The gap 26 between the side walls 25 of the ventilation member attachment portion 23 of the resin tube for ventilation 20 also serves as a ventilation hole with outside. With reference to FIG. 2(B), when the ventilation member 30 is fitted to the ventilation member attachment portion 23 of the resin tube for ventilation 20, the side wall portions 38 of the ventilation member 30 are placed opposite to the gaps 26 between the side walls 25 of the ventilation member attachment portion 23 so as to prevent foreign objects, such as water and refuse, from entering through the side gaps 26 and hitting the ventilation film 35.

The insertion portion 21 of the resin tube for ventilation 20 where the ventilation member 30 is fitted to the ventilation member attachment portion 23 is fitted internally to the attachment tubular portion 15 of the waterproof cover 10. Then, a binding band 43 is wound around the outer peripheral surface of the attachment tubular portion 15 for better adhesion (FIG. 1(B)).

Thus, in the present embodiment, the cylindrical attachment tubular portion 15 projects from the peripheral wall 19 of the intermediate portion 13 between the link portions 11 and 12 in the two end portions of the waterproof cover 10 composed of a rubber or elastomer. The resin tube for ventilation 20 is internally fitted and fixated to the attachment tubular portion 15, the resin tube for ventilation 20 having the cylindrical ventilation member 30 to which the ventilation film 35 is fixed in the diameter direction in cross section. Accordingly, the ventilation film 35 prevents foreign objects, such as water and refuse, from entering and ensures the waterproof cover 10 to be breathable, thus preventing a change in inner pressure even when temperature inside the waterproof cover 10 changes. Thus, the waterproof cover 10 is prevented from deforming substantially and sealing performance is prevented from deteriorating in the link portions 11 and 12 in the two end portions. Concurrently, the waterproof cover 10, which expands substantially due to an increase in temperature, is prevented from interfering with a peripheral member and getting damaged. Thus, the waterproof cover 10 can maintain high waterproof performance.

<Second Embodiment>

Figure 5:
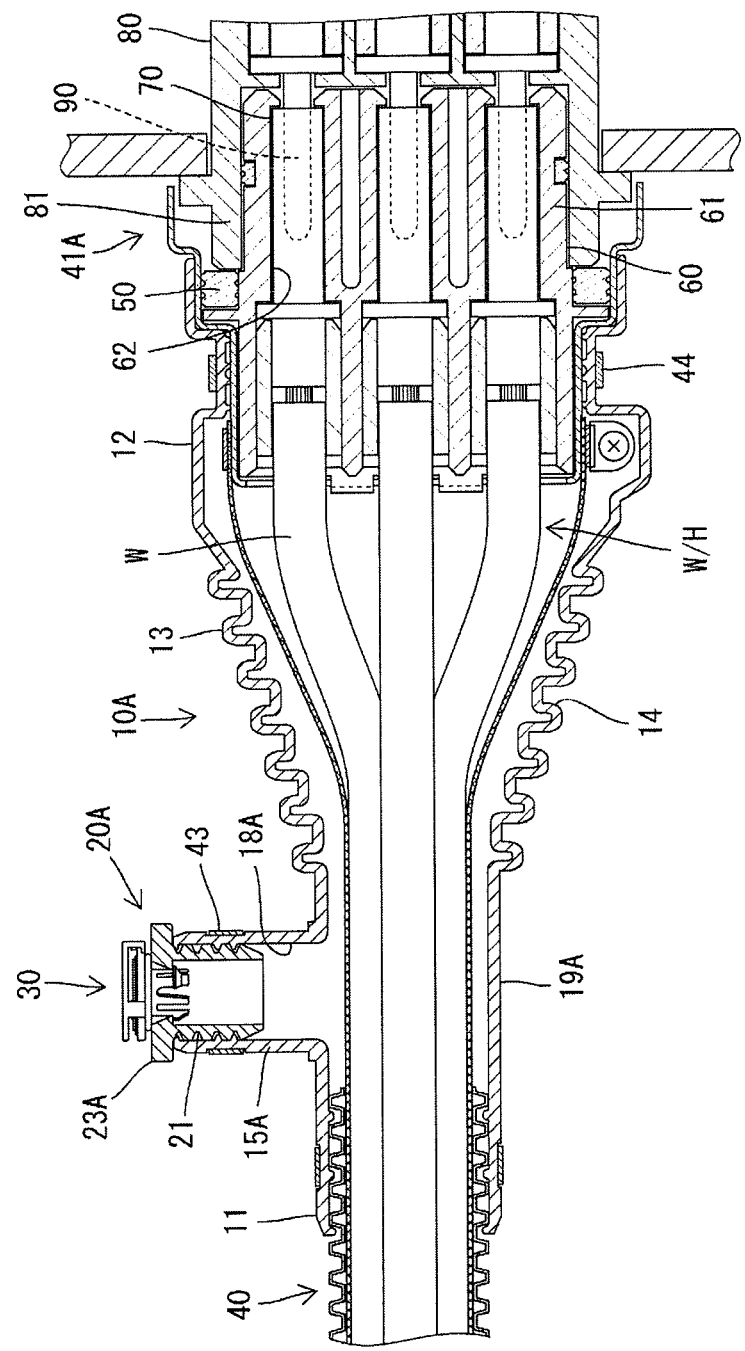
[FIG. 5] A cross-sectional view of a waterproof cover according to a second embodiment of the present invention.

A second embodiment of the present invention is described below with reference to FIGS. 5 to 7. A waterproof cover 10A according to the second embodiment is different from the first embodiment in a position where an attachment tubular portion 15A is provided, an inner surface shape of an attachment hole 18A, and a portion of a shape of a resin tube for ventilation 20A. Furthermore, a shield shell 41A to which the link portion 12 in a second end portion of the waterproof cover 10A is attached is provided so as to cover a connector 60. Other configurations are similar to those in the first embodiment. The configurations in the second embodiment similar to those in the first embodiment are denoted by the same reference numerals and redundant descriptions are omitted.

The connector 60 has a synthetic resin housing 61. With reference to FIG. 5, three cavities 62 are provided in parallel in the housing 61. Three insulating covered electric wires W included in a wire harness W/H are each connected to a terminal fitting 70, which is housed in the corresponding cavity 62 in the housing 61. The connector 60 is fitted to a mating connector 80 and is inserted in a hood portion 81 of the mating connector 80. The terminal fitting 70 is electrically connected to a tab-shaped mating terminal fitting 90 projecting inside the hood portion 81.

Similar to the first embodiment, the shield shell 41A is composed of a metal plate and has a tubular shape through which the wire harness W/H can be inserted. In the shield shell 41A, the connector 60 is housed in a state projecting forward. A seal ring 50 is provided between the shield shell 41A and the housing 61 of the connector 60. The seal ring 50 seals the shield shell 41A and the connector 60. A peripheral wall 19A of the waterproof cover 10A covers from outside the shied shell 41A that covers an outer surface of the connector 60. A fastening member 44, such as a binding band, fixates the peripheral wall 19A to the shield shell 41A.

The attachment tubular portion 15A projects from the small-diameter tubular link portion 11 side of the peripheral wall 19A of the waterproof cover 10A. Specifically, in an area on the link portion 11 side, the attachment tubular portion 15A is provided between a front end of the corrugated tube 40 fitted to the link portion 11 and the corrugated portion 14 in the widening-diameter tubular intermediate portion 13. The attachment tubular portion 15A projects in a direction orthogonal to the length direction of the link portion 11 and a direction identical to the widening-diameter direction of the large-diameter tubular link portion 12. With respect to the projecting direction of the attachment tubular portion 15A, the attachment tubular portion 15A and the large-diameter tubular link portion 12 have an overlapping positional relationship, and the attachment tubular portion 15A is provided so as not to project from an outer end of the link portion 12 in the widening-diameter direction.

Figure 6:
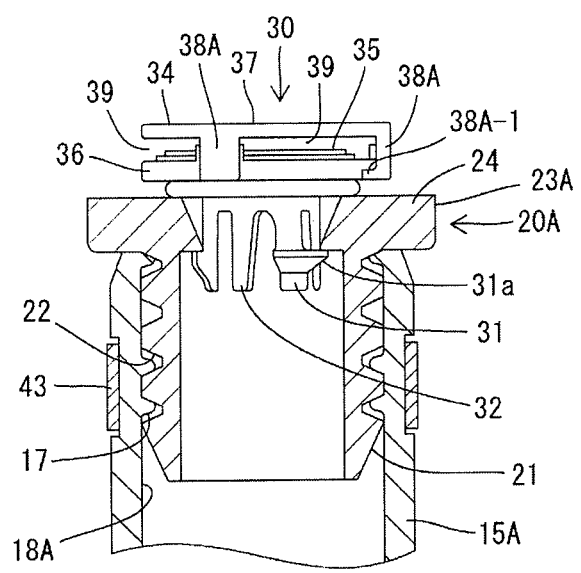
[FIG. 6] A partial cross-sectional view of an attachment tubular portion of the waterproof cover.
Figure 7:
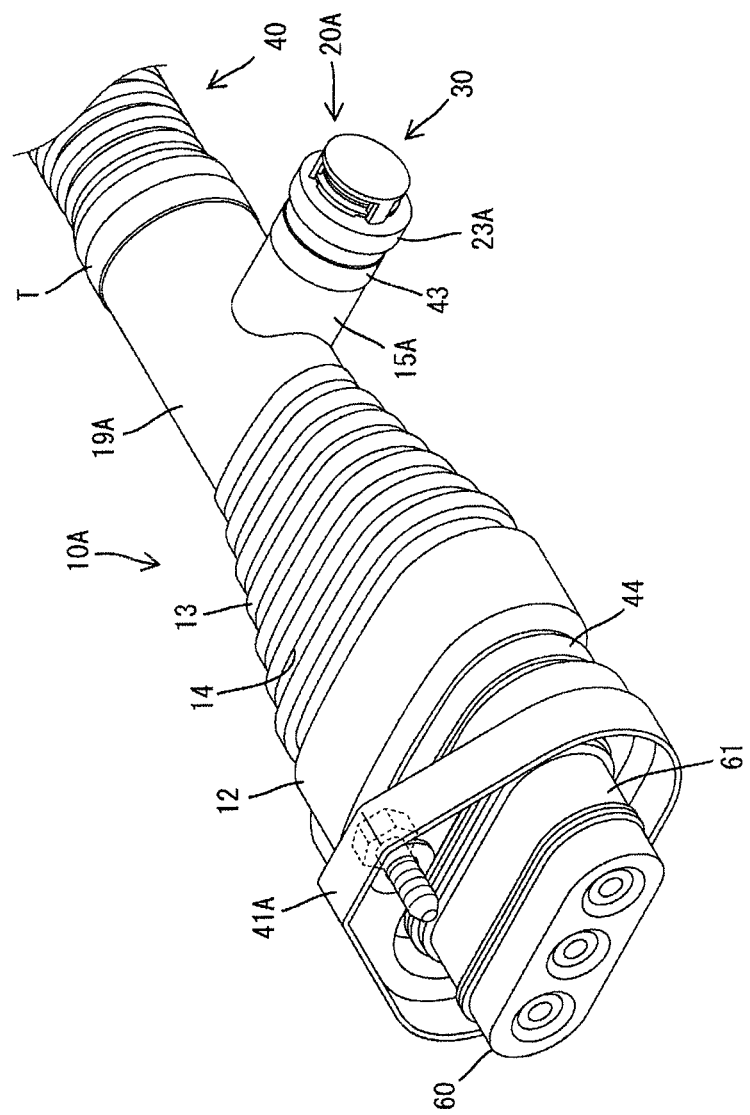
[FIG. 7] A perspective view of the waterproof cover.

With reference to FIG. 6, of an inner surface of the attachment hole 18A of the attachment tubular portion 15A, a concavo-convex corresponding portion 17 having a concavo-convex shape in a circumferential direction is provided in a position opposite to a position where the binding band 43 is wound around. When the insertion portion 21 of the resin tube for ventilation 20A is inserted to the attachment tubular portion 15A, the concavo-convex portion 22 is fitted and locked to the concavo-convex corresponding portion 17. This improves reliability in positioning the resin tube for ventilation 20A relative to the attachment tubular portion 15A and in preventing disengagement of the resin tube for ventilation 20A.

In addition, in the resin tube for ventilation 20A, the side walls 25 are eliminated from the ventilation member attachment portion 23A, which thus has a simple structure including the bottom wall 24 only. According to the second embodiment, the attachment tubular portion 15A is provided on the small-diameter tubular link portion 11 side, and the attachment tubular portion 15A and the large-diameter tubular link portion 12 have the portions overlapping each other in the projecting direction of the attachment tubular portion 15A. This prevents the attachment tubular portion 15A from projecting substantially to the waterproof cover 10A and achieves excellent space efficiency. As a result, the waterproof cover 10A can readily prevent interference with a peripheral component and have excellent versatility.

<Alternative Embodiment>

According to the present invention, provided that the inner pressure adjustment member is breathable and capable of regulating foreign objects from passing though, a mode thereof is not limited. In some cases, the inner pressure adjustment member may be directly attached inside the attachment member without the resin tube for ventilation.

REFERENCE SIGNS LIST 10, 10A: Waterproof cover
11, 12: Link portion
13: Intermediate portion
15, 15A: Attachment tubular portion
18, 18A: Attachment hole
19, 19A: Peripheral wall
20, 20A: Resin tube for ventilation
21: Insertion portion
22: Concavo-convex portion
23, 23A: Ventilation member attachment portion
24: Bottom wall
24a: Opening
25: Side wall
26: Gap
30: Ventilation member
31: Lock portion
33: Rubber ring for sealing
34: Ventilation film holder
35: Ventilation film (inner pressure adjustment member)
36: Support portion
37: Cover portion
38 (38A, 38B): Side wall portion
39: Ventilation hole
40: Corrugated tube (attachment member)
41, 41 A (attachment member)
43: Binding band

The invention claimed is:

1. A waterproof cover having a peripheral wall covering a circumference of a wire harness, the peripheral wall being composed of one of a rubber and an elastomer, the peripheral wall having two end portions connected to an attachment member, wherein
the peripheral wall has an attachment hole passing through the peripheral wall in a thickness direction and an inner pressure adjustment member adjusting inner pressure of the waterproof cover is provided inside the attachment hole.

2. The waterproof cover according to claim 1, wherein the peripheral wall has an attachment tubular portion projecting outward in the thickness direction of the peripheral wall and the attachment hole is provided inside the attachment tubular portion.

3. The waterproof cover according to claim 2, wherein the inner pressure adjustment member is a ventilation film provided inside a resin tube for ventilation and the resin tube for ventilation is attached to the attachment tubular portion.

4. The waterproof cover according to claim 3, wherein the inner pressure adjustment member is attached to a ventilation member and the ventilation member is attached to the resin tube for ventilation.

5. The waterproof cover according to claim 4, wherein the resin tube for ventilation has a ventilation member attachment portion allowing the ventilation member to be tightly fitted.

6. The waterproof cover according to claim 5, wherein the resin tube for ventilation has an insertion portion extending from the ventilation member attachment portion and insertable to the attachment tubular portion, the ventilation member attachment portion has a bottom wall having an opening connected to a hollow portion of the insertion portion, and the bottom wall has a portion projecting outward more than an outer periphery of the insertion portion and is positioned to be contactable with a projecting end surface of the attachment tubular portion.

7. The waterproof cover according to claim 6, wherein the insertion portion has a concavo-convex portion on an outer peripheral surface, a binding band is wound around an outer peripheral surface of the attachment tubular portion corresponding to the concavo-convex portion, and thus the resin tube for ventilation is fixated to the attachment tubular portion.

8. The waterproof cover according to claim 6, wherein
the ventilation member comprises:
a plurality of lock portions inserted and locked to the opening of the bottom wall; and
a ventilation film holder extending from the lock portions and fixated to the bottom wall via a rubber ring for sealing, wherein
the ventilation film holder comprises:
an annular support portion supporting a periphery of the circular ventilation film from a lower surface side;
a circular cover portion provided on an upper surface side of the ventilation film with a gap therebetween; and
a plurality of side wall portions linking the support portion and a periphery of the cover portion, and wherein
a gap between adjacent side wall portions is a ventilation hole.

9. The waterproof cover according to claim 1, wherein
the wire harness is routed in a vehicle underbody and two ends are connected to a motor and an inverter or an inverter and a battery,
a first end portion of the peripheral wall is attached to one of an end portion of a metal pipe externally mounted to the wire harness and an end portion of a corrugated tube connected to the metal pipe, and
a second end portion of the peripheral wall is attached to one of a housing and a shell-shaped member attached to a case of one of the motor, the inverter, and the battery.

10. The waterproof cover according to claim 9, wherein
the first end portion of the peripheral wall is a small-diameter tubular portion and the second end portion of the peripheral wall is a large-diameter tubular portion having a larger diameter than the small-diameter tubular portion,
the small-diameter tubular portion has an attachment tubular portion projecting outward in a thickness direction of the small-diameter tubular portion and the attachment hole is provided inside the attachment tubular portion, and
the large-diameter tubular portion and the attachment tubular portion have portions overlapping each other in a projecting direction of the attachment tubular portion.

* * * * *